(12) United States Patent
Reichert et al.

(10) Patent No.: US 8,480,525 B2
(45) Date of Patent: Jul. 9, 2013

(54) HYBRID VEHICLE TRANSMISSION

(75) Inventors: Heinz Reichert, Markdorf (DE); Gert Hanker, Meckenbeuren (DE); Martin Vogel, Immenstaad (DE); Dietmar Illerhaus, Hergensweiler (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/504,646

(22) PCT Filed: Oct. 13, 2010

(86) PCT No.: PCT/EP2010/065303
§ 371 (c)(1),
(2), (4) Date: Apr. 27, 2012

(87) PCT Pub. No.: WO2011/054637
PCT Pub. Date: May 12, 2011

(65) Prior Publication Data
US 2012/0220403 A1 Aug. 30, 2012

(30) Foreign Application Priority Data
Nov. 4, 2009 (DE) .......................... 10 2009 046 366

(51) Int. Cl.
*F16H 3/72* (2006.01)
(52) U.S. Cl.
USPC ............................................................ 475/5

(58) Field of Classification Search
None
See application file for complete search history.

(56) References Cited

U.S. PATENT DOCUMENTS

| | | | |
|---|---|---|---|
| 6,719,655 B2 | 4/2004 | Kramer | |
| 2002/0040818 A1 | 4/2002 | Maruyama | |
| 2013/0109524 A1* | 5/2013 | Kaltenbach et al. | 475/5 |
| 2013/0109530 A1* | 5/2013 | Kaltenbach et al. | 477/5 |

FOREIGN PATENT DOCUMENTS

| | | |
|---|---|---|
| DE | 43 18 065 A1 | 12/1994 |
| DE | 101 52 472 A1 | 5/2003 |
| DE | 10 2006 028 602 A1 | 12/2007 |
| DE | 10 2007 022 774 A1 | 11/2008 |
| DE | 10 2007 047 802 A1 | 5/2009 |
| JP | 2003-019911 A | 1/2003 |
| WO | 2007/009582 A1 | 1/2007 |
| WO | 2007/147732 A1 | 12/2007 |

* cited by examiner

*Primary Examiner* — Dirk Wright
(74) *Attorney, Agent, or Firm* — Davis & Bujold, PLLC

(57) ABSTRACT

A hybrid vehicle transmission (3) which comprises a transmission input shaft (9), which can be connected to a drive motor by a shift element (12), and an electric machine (7) which can be operatively connected to the transmission input shaft in order to transmit torque. An additional shift element (8) is provided by which the electric machine (7) can be operatively connected to the transmission input shaft and can be disconnected from the transmission input shaft (9).

11 Claims, 3 Drawing Sheets

HYBRID VEHICLE TRANSMISSION

This application is a National Stage completion of PCT/EP2010/065303 filed Oct. 13, 2010, which claims priority from German patent application serial no. 10 2009 046 366.6 filed Nov. 4, 2009.

FIELD OF THE INVENTION

The invention relates to a hybrid vehicle transmission.

BACKGROUND OF THE INVENTION

Hybrid vehicle transmissions known from practice have various design configurations depending on the vehicle weight, the vehicle load, trailer operation, the desired gradeability of a vehicle designed with a hybrid vehicle transmission, driving over a curb edge in pure electric mode, and the like. So, for example, in vehicles having a high vehicle weight, an electric machine of a hybrid vehicle transmission or the rotor thereof is connected to the transmission input shaft by means of a planetary transmission having a constant transmission ratio of approximately 1.7. For vehicles having a low vehicle weight, the electric machine or the rotor thereof is coupled directly to the transmission input shaft at a transmission ratio equal to 1.

Additional drive motors of hybrid drive trains, often designed as internal combustion engines, can be connected to the transmission input shaft by means of a shift element, wherein disadvantageously only the entire drive can be disconnected from the transmission input shaft for the hybrid vehicle transmissions described above, for which reason the vehicle cannot be driven by means of the internal combustion engine alone.

Furthermore, because of the hybrid vehicle transmission variant designed with the constant transmission ratio, a drive-off torque electrically generated in the region of the electric machine cannot be provided in the region of the transmission input shaft at the level of a drive-off torque that can be provided by means of a conventional transmission for a vehicle driven by an internal combustion engine.

Therefore, a so-called emergency drive-off of a vehicle with a connected internal combustion engine is required, depending on a loading state of the vehicle, a grade presently to be driven through, a curb edge, or the like, although an electric storage device associated with the electric machine has a sufficient state of charge. However, such emergency drive-offs are undesired, because they increase the fuel consumption of a hybrid vehicle to an undesired extent.

In addition, for the hybrid vehicle transmission variants described above, a rotor of an electric machine cannot be uncoupled from the transmission input shaft, so that during cross-country drives during which an electric storage medium associated with the electric machine is fully charged and during which a vehicle is driven substantially only by the internal combustion engine, the rotor mass of the electric machine must also be continuously moved or accelerated, whereby in turn the fuel consumption is likewise increased.

In addition, the maximum speed of a vehicle designed with a hybrid vehicle transmission described above is limited due to a permissible maximum rotational speed of the electric machine. This results from the fact that the permissible maximum rotational speed of a common electric machine is approximately 4,500 revolutions per minute. However, at an internal combustion engine rotational speed of 2,800 revolutions per minute, which substantially corresponds to the rotational speed of the transmission input shaft, and a constant transmission ratio of 1.7 between the transmission input shaft and the rotor, the rotor of the electric machine is driven at a rotational speed of 4,760 revolutions per minute, so that the permissible maximum rotational speed of a common electric machine is exceeded.

SUMMARY OF THE INVENTION

Therefore, the problem to be solved by the present invention is that of providing a hybrid vehicle transmission by means of which a hybrid vehicle can be operated with the lowest possible fuel consumption and by means of which impermissible rotational speeds on the part of an electric machine can be avoided using a simple design.

This problem is solved by a hybrid vehicle transmission.

The hybrid vehicle transmission according to the invention is designed with a transmission input shaft that can be connected to a drive motor by means of a shift element. Furthermore, the hybrid vehicle transmission has an electric machine, which can be operatively connected to the transmission input shaft in order to transmit torque.

According to the invention, an additional shift element is provided, by means of which the electric machine can be disconnected from the transmission input shaft and can be operatively connected to the transmission input shaft.

Thus it is easy to uncouple the electric machine from the transmission input shaft during a cross-country drive and to operate a vehicle with the lowest possible fuel consumption while the vehicle is being driven purely by the internal combustion engine.

In addition, a correspondingly high transmission ratio can be provided in the region between the electric machine and the transmission input shaft due to the shiftable operative connection between the transmission input shaft and the electric machine, and, because of this transmission ratio, an emergency drive-off is to be provided using an additional drive motor designed as an internal combustion engine only when the electric storage device associated with the electric machine has an insufficient state of charge, whereby a load in the region of the shift element that connects the transmission input shaft to the drive motor is reduced and the fuel consumption of the vehicle can also be reduced.

Furthermore, because of the uncoupling of the electric machine from the transmission input shaft in the region of the additional shift element, a maximum vehicle speed can be set independently of the permissible maximum rotational speed of an electric machine using a simple design, so that a hybrid vehicle can be operated at the same speed as a conventional vehicle designed without a hybrid drive.

The design of the hybrid vehicle transmission according to the invention also makes it possible to equip various possible vehicle applications such as delivery vehicles and buses with a single hybrid transmission variant.

Additional advantages and advantageous embodiments of the hybrid vehicle transmission according to the invention can be found in the claims and in the subsequent embodiment examples described based on the drawings; for the sake of clarity, the same reference characters are used for components with the same design and function in the description of the different embodiment examples.

The features indicated in the dependent claims as well as the features indicated in the following embodiment examples of the hybrid vehicle transmission according to the invention are suitable for developing the subject matter of the invention by themselves or in any combination with each other. The combination of a given set of features does not represent a restriction on the development of the subject matter of the invention and is essentially only representative in nature.

DETAILED DESCRIPTION OF THE PREFERRED EMBODIMENTS

Figure 1:
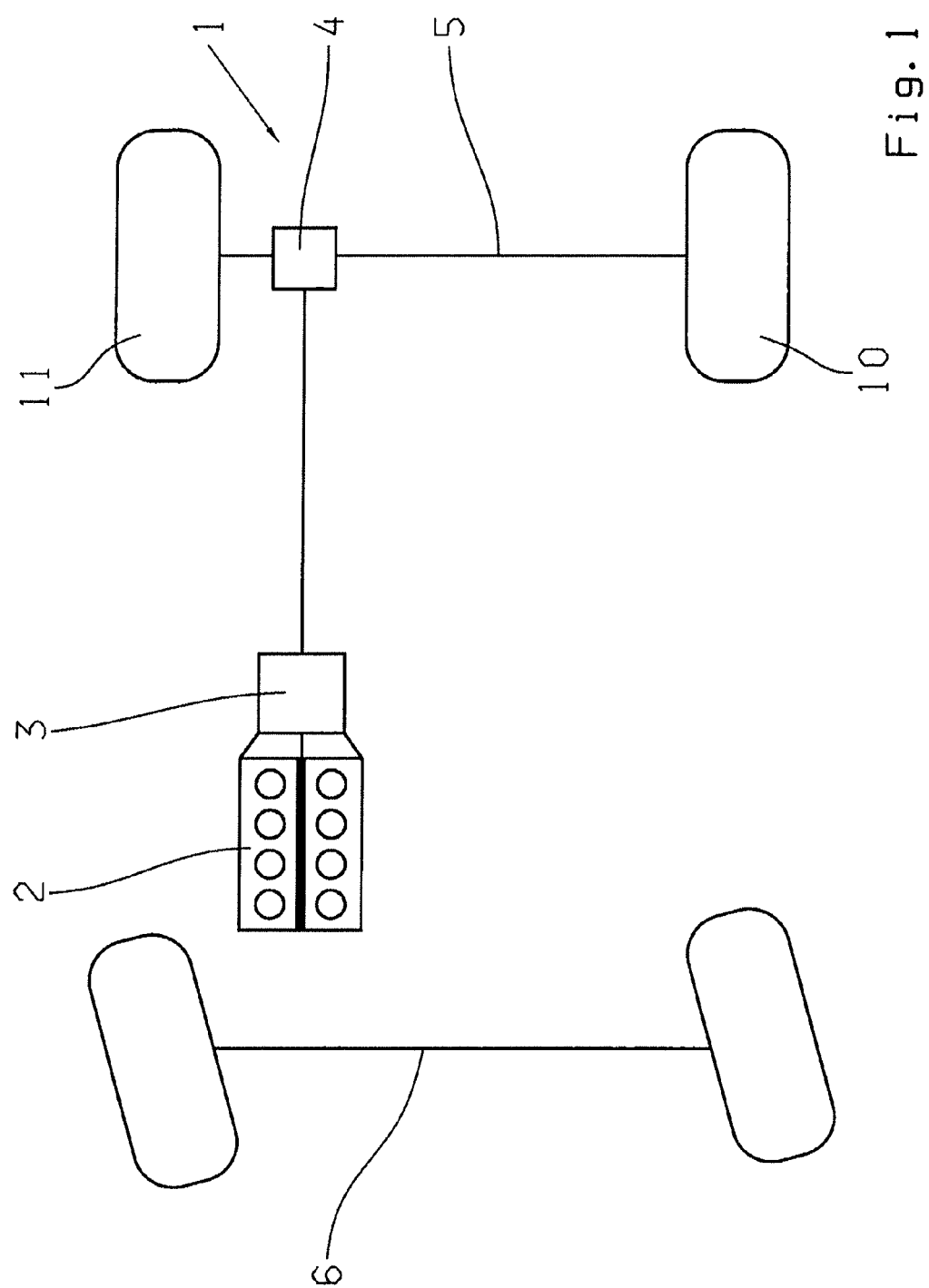
FIG. 1 a highly schematic representation of a hybrid vehicle drive train.

In FIG. 1, a hybrid vehicle drive train 1 is depicted, which comprises a drive motor 2, a hybrid vehicle transmission 3, by means of which various transmission ratios for forward and reverse driving can be provided, a differential unit 4, and two vehicle axles 5, 6, wherein in the present case the vehicle axle 5 is the rear vehicle axle and the vehicle axle 6 is the front vehicle axle.

The hybrid vehicle transmission 3 comprises an electric machine 7, which is depicted in more detail in FIG. 2 to FIG. 6 and which can be operatively connected to a transmission input shaft 9 by means of a form-locking shift element 8 in the manner described later. The form-locking shift element 8 can also be designed as a friction-locking multi-disk shift element or as a synchronizer depending on the particular application.

Furthermore, the hybrid vehicle transmission 3 comprises a transmission region by means of which the various transmission ratios for forward and reverse driving can be provided. This transmission region in itself can be designed in any manner so that the transmission ratio required depending on the particular operating state of the hybrid vehicle drive train 1 can be provided.

In the embodiment example of the hybrid vehicle drive train 1 depicted in FIG. 1, the drive motor 2 is designed as an internal combustion engine and can also be designed as an electric machine in an advantageous development. The differential unit 4 is disposed between the hybrid vehicle transmission 3 and the vehicle axle 5, which is connected on each vehicle side to at least one driven wheel 10, 11 in the familiar manner.

In addition, the drive motor 2 can be coupled to the transmission input shaft 9 by means of a shift element 12, which is friction-locking in the present case, so that torque produced by the drive motor 2 can be transmitted to the hybrid vehicle transmission 3 and in the direction of the vehicle axle 5. The hybrid vehicle drive train 1 can be operated in various states depending on the operating state of the drive motor 2, of the electric machine 7, and of the shift elements 8 and 12.

So, for example, if the shift element 12 is disengaged, and thus the drive motor 2 is disconnected from the rest of the hybrid vehicle drive train 1, a vehicle designed with the hybrid vehicle drive train 1 can be driven purely by electric motor if the electric machine 7 is coupled to the transmission input shaft 9 by means of the shift element 8, which is form-locking in the present case.

Furthermore, with the shift element 12 disengaged and during overrunning operation of the hybrid vehicle drive train, braking energy can be recovered in the region of the electric machine 7, which is then operated as a generator, while the form-locking shift element 8 is engaged, wherein of course the recovery operation can also be performed while the friction-locking shift element 12 is engaged.

In the engaged operating state of the friction-locking shift element 12 and in the simultaneous disengaged operating state of the form-locking shift element 8, a vehicle designed with the hybrid vehicle drive train 1 can be driven purely by means of the drive motor 2, that is to say, purely by the internal combustion engine. A so-called boost operation of the hybrid vehicle drive train 1 can be provided in the engaged operating state of the two shift elements 8 and 12, during which drive torque of the drive motor 2 and drive torque of the electric machine 7 can be both be supplied to the vehicle axle 5.

In the present case, a vibration damper 13, by means of which vibrations resulting from rotational irregularities of the drive motor 2 are introduced into the hybrid vehicle transmission 3 and thus into the remaining region of the hybrid vehicle drive train 1 in a damped manner, is provided between the drive motor 2 and the friction-locking shift element 12.

In the present case, the form-locking shift element 8 can be shifted between two shift positions S1 and S2. In the first shift position S1 of the form-locking shift element 8, the electric machine 7 is disconnected from the transmission input shaft 9, and in the second shift position S2, the electric machine is coupled to the transmission input shaft 9.

In addition, a transmission pump 14 is operatively connected to the transmission input shaft 9 in the region of the operative connection between the electric machine 7 and the transmission input shaft 9, so that the transmission pump 14 can be driven by both the drive motor 9 and the electric machine 7. Thus it is ensured in a simple manner that assemblies of the hybrid vehicle transmission to be supplied with hydraulic fluid can each be pressurized or supplied with a hydraulic pressure required for the function of the hybrid vehicle transmission.

Figure 2:
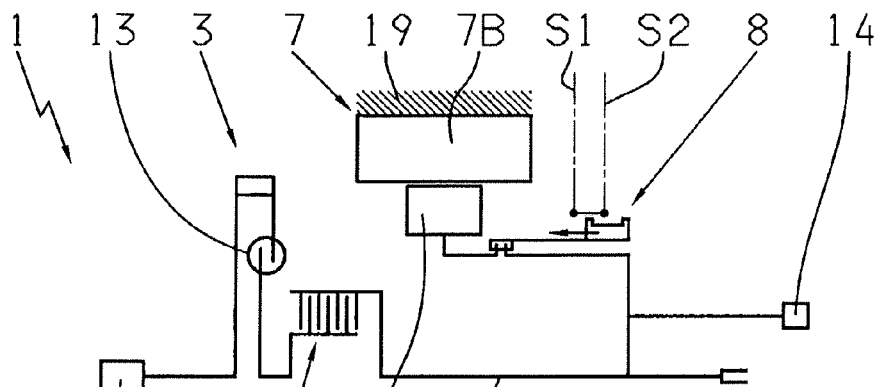
FIG. 2 a simplified partial representation of a transmission input region of a first embodiment of a hybrid vehicle transmission of the hybrid vehicle drive train according to FIG. 1.

The further embodiment examples of the hybrid vehicle transmission 1 depicted in FIG. 3 to FIG. 6 differ from the embodiment example shown in FIG. 2 only in sub-regions. Therefore, in the following description, mainly only the differences will be discussed, and reference will be made to the previous description for FIG. 2 in regard to the further function of the hybrid vehicle transmission.

Figure 3:
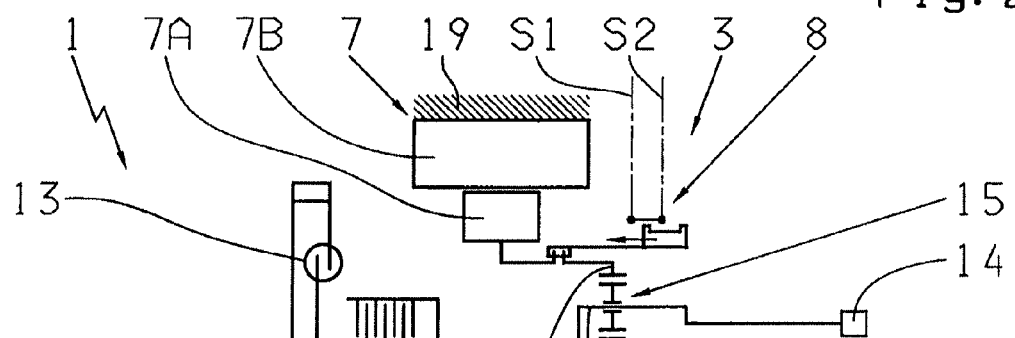
FIG. 3 a representation, corresponding to FIG. 2, of a second embodiment example of the hybrid vehicle transmission of the hybrid vehicle drive train according to FIG. 1.

In the embodiment example of the hybrid vehicle transmission 3 depicted in FIG. 3, a planetary transmission device 15 is provided in the region of the operative connection between the electric machine 7 and the transmission input shaft 9 that can be shifted by means of the form-locking shift element 8. A rotor 7A of the electric machine 7 is connected to a ring gear 16 of the planetary transmission device 15 in a rotationally fixed manner in the second shift position S2 of the shift element 8 and is disconnected from the ring gear 16 in the first shift position S1 of the form-locking shift element 8. A stator 7B of the electric machine 7 is fixed to the housing to the same extent as a sun gear 17 of the planetary transmission device 15.

In the present case, the transmission input shaft 9 is connected to a planet carrier 18 of the planetary transmission device 15 in a rotationally fixed manner, so that torque of the electric machine 7 is transmitted at a transmission ratio of, for example, 1.7 in the second shift position S2 of the form-locking shift element 8. However, depending on the particular application, the transmission ratio of the planetary transmission device 15 can also be greater than or less than 1.7.

Figure 4:
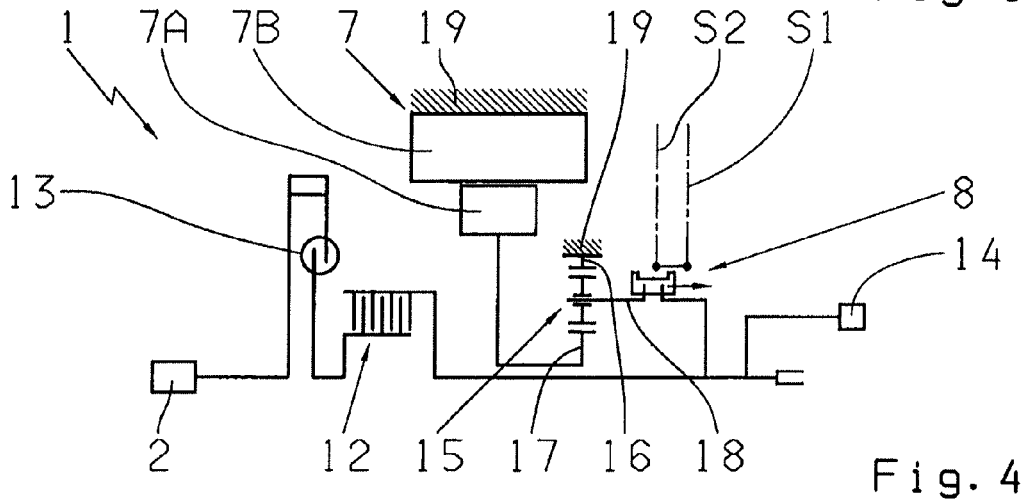
FIG. 4 a representation, corresponding to FIG. 2, of a third embodiment example of the hybrid vehicle transmission of the hybrid vehicle drive train according to FIG. 1.

In the embodiment example of the hybrid vehicle transmission 3 depicted in FIG. 4, the ring gear 16 of the planetary transmission device 15 is fixed to the housing and the planet carrier 18 is operatively connected to the transmission input shaft 9 in the second shift position S2 of the form-locking shift element 8, while the rotor 7A is connected to the sun gear 17 of the planetary transmission device 15 in a rotationally fixed manner.

In the present case, because of the coupling of the rotor 7A to the planetary transmission device 15 described immediately above, torque provided by the electric machine 7 is applied to the transmission input shaft at a transmission ratio of, for example, 2.7 while the form-locking shift element 8 is engaged. In the first shift position S1 of the form-locking shift element 8, the rotor 7A of the electric machine 7 is disconnected from the transmission input shaft 9.

Figure 5:
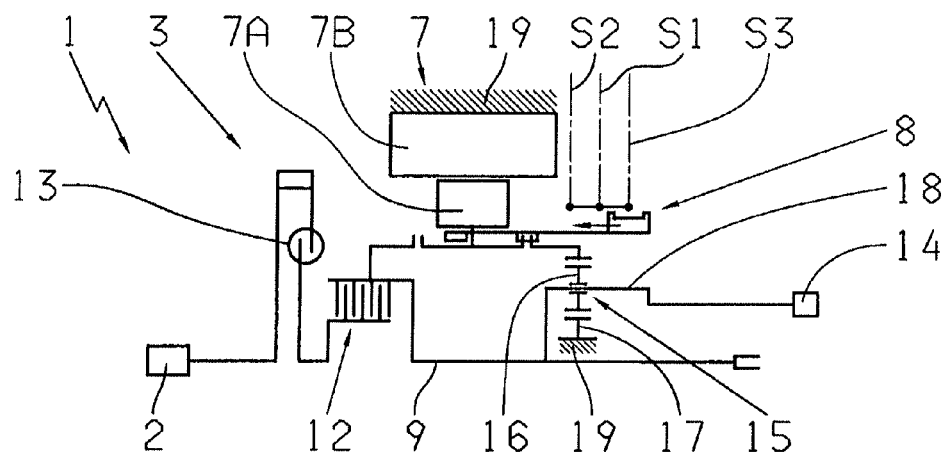
FIG. 5 a representation, corresponding to FIG. 2, of a fourth embodiment example of the hybrid vehicle transmission of the hybrid vehicle drive train according to FIG. 1.

FIG. 5 shows a fourth embodiment example of the hybrid vehicle transmission 3 in a representation corresponding to FIG. 2, wherein the form-locking shift element 8 can be put into three different shift positions S1, S2, and S3. In the first shift position S1, the rotor 7A of the electric machine 7 is uncoupled from the transmission input shaft 9 and from the ring gear 16 of the planetary transmission device 15, so that torque of the electric machine 7 cannot be applied to the transmission input shaft 9 and thus to the rest of the hybrid vehicle drive train 1. In the second shift position S2 of the form-locking shift element 8, the rotor 7A of the electric machine 7 is directly connected to the transmission input shaft 9, while the rotor 7A is disconnected from the ring gear 16 of the planetary transmission device 15. Thus, in the second shift position S2, torque of the electric machine 7 is applied to the transmission input shaft 9 at the transmission ratio of 1.

In the third shift position S3 of the form-locking shift element 8, the electric machine 7 is connected in the region of the rotor 7A to the ring gear 16 of the planetary transmission device 15 in a rotationally fixed manner and the direct connection between the rotor 7A and the transmission input shaft 9 is disconnected. The transmission input shaft 9 in turn is connected to the planet carrier 18 of the planetary transmission device 15 in a rotationally fixed manner and the sun gear 17 in turn is fixed to the housing, so that torque of the electric machine 7 is applied to the transmission input shaft 9 at a transmission ratio of, for example, 1.7 in the third shift position S3 of the form-locking shift element 8.

Figure 6:
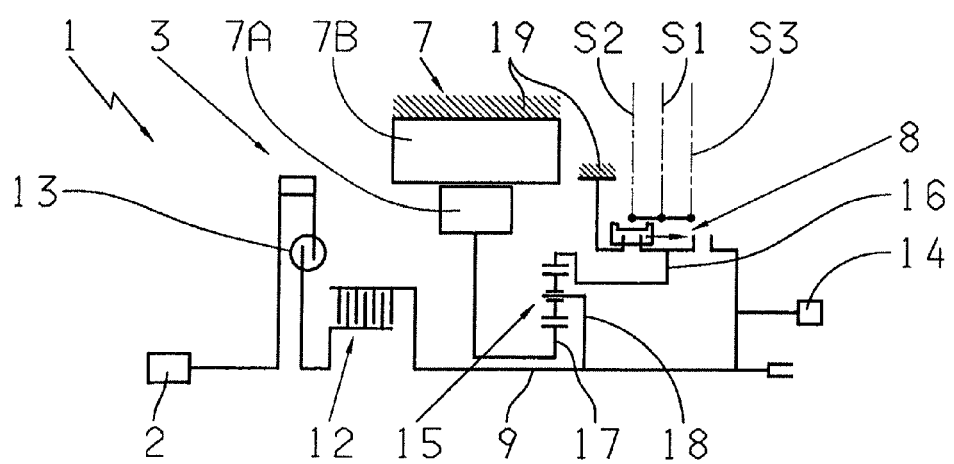
FIG. 6 a representation, corresponding to FIG. 2, of a fifth embodiment example of the hybrid vehicle transmission of the hybrid vehicle drive train according to FIG. 1.

In the fifth embodiment example of the hybrid vehicle transmission 3 depicted in FIG. 6, the form-locking shift element 8 again can be put into three different shift positions S1 to S3. The electric machine 7 is connected in the region of the rotor 7A to the sun gear 17 of the planetary transmission device 15 in a rotationally fixed manner. The transmission input shaft 9 in turn is coupled to the planet carrier 18. The ring gear 16 of the planetary transmission device 15 is uncoupled from both a housing 19 of the hybrid vehicle transmission 3 and the transmission input shaft 9 in the first shift position S1 of the form-locking shift element 8.

In the second shift position S2 of the form-locking shift element 8, the ring gear 16 is fastened to the housing and torque of the electric machine 7 is applied to the transmission input shaft 9 at a transmission ratio of, for example, 2.7 in the present case. If the form-locking shift element 8 is put into the third shift position S3 thereof, the ring gear 16 is connected to the transmission input shaft 9 in a rotationally fixed manner and the planetary transmission device 15 is in the blocked operating state. Thus, in the third shift position S3 of the form-locking shift element 8, torque of the electric machine 7 is applied to the transmission input shaft 9 at the transmission ratio of 1, that is to say, directly.

Both in the fourth embodiment of the hybrid vehicle transmission 3 and in the fifth embodiment of the hybrid vehicle transmission 3, the hybrid vehicle drive train 1 can be operated in the region of the transmission input of the hybrid vehicle transmission at different transmission ratio steps in the region between the electric machine 7 and the transmission input shaft 9, so that the electric machine can be operated at the optimal operating point thereof depending of the particular driving situation. Furthermore, the electric machine 7 can also be uncoupled from the transmission input shaft 9, so that the fuel consumption of a vehicle designed with the hybrid vehicle drive train 1 can be reduced in a simple manner depending on the operating state.

In the fifth embodiment of the hybrid vehicle transmission 3 depicted in FIG. 6, the electric machine 7, together with the entire planetary transmission device 15, can be decoupled from the transmission input shaft 9 by means of the form-locking shift element 8, so that, in particular during a cross-country drive, there are lower component loads in the region of the planetary transmission device 15 and of the electric machine 7, lower noise generation is caused in the region of the teeth meshing of the planetary transmission device 15, and the fuel consumption of a vehicle designed with the hybrid vehicle drive train 1 is reduced because of the reduced drag torques.

On principle, in all embodiment examples of the hybrid vehicle transmission 3 depicted in the drawing, the form-locking shift element 8 can be synchronized by corresponding operation of the electric machine 7 for load-free shifts between the shift positions S1, S2 or S1 to S3 and can be actuated by means of an electric or hydraulic actuator, for example by means of a shift fork.

Thus, for example, if the rotor 7A of the electric machine 7 is uncoupled from the transmission input shaft 9, the drive torque of the electric machine 7 can be briefly reduced and a selector sleeve of the form-locking shift element 8 can be moved by means of the actuator with low shifting force, so that the rotor 7A is disconnected from the transmission input shaft 9 or the ring gear 16 of the planetary transmission device 15.

During the establishment of the operative connection between the rotor 7A of the electric machine 7 and the transmission input shaft 9 or the ring gear 16 of the planetary transmission device 15, the shift element half of the form-locking shift element 8 connected to the electric machine 7 is set to the rotational speed of the transmission input shaft 9 by means of a corresponding operation of the electric machine 7, so that the shift element 8 can be put into the particular shift position required with low shifting forces.

REFERENCE CHARACTERS

1 Hybrid vehicle drive train
2 Drive motor
3 Hybrid vehicle transmission
4 Differential unit
5, 6 Vehicle axle
7 Electric machine
7A Rotor
7B Stator
8 Form-locking shift element 9 Transmission input shaft
10, 11 Driven wheel
12 Friction-locking shift element
13 Vibration damper
14 Transmission pump
15 Planetary transmission device
16 Ring gear
17 Sun gear
18 Planet carrier
19 Transmission housing
S1 to S3 Shift position of the form-locking shift element

The invention claimed is:

1. A hybrid vehicle transmission (3) comprising:
a transmission input shaft (9) being connectable to a drive motor (2) by a shift element (12),
and an electric machine (7) being operatively connectable to the transmission input shaft (9) to transmit torque,
an additional shift element (8) being provided, by which the electric machine (7) being disconnectable from the transmission input shaft (9) and operatively connectable to the transmission input shaft,
the electric machine (7) being disconnected from the transmission input shaft (9), in a first shift position (S1) of the additional shift element (8), and being coupled to the transmission input shaft (9), in a second shift position (S2) of the additional shift element (8), and
a planetary transmission device (15) being provided in a region of the shiftable operative connection between the electric machine (7) and the transmission input shaft (9), and the planetary transmission device (15) being blockable, by the additional shift element (8), by which the operative connection between the transmission input shaft (9) and the electric machine (7) is shifted.

2. The hybrid vehicle transmission according to claim 1, wherein the planetary transmission device (15), in an unblocked operating state, is the second shift position (S2) of the additional shift element (8).

3. The hybrid vehicle transmission according to claim 1, wherein the electric machine (7) is operatively connected to the transmission input shaft (9), in a third shift position (S3) of the additional shift element (8), and the planetary transmission device (15) is in a blocked operating state.

4. The hybrid vehicle transmission according to claim 1, wherein a planet carrier (18) of the planetary transmission device (15) is operatively connected to the transmission input shaft (9), a sun gear (17) of the planetary transmission device (15) is connected to a rotor (7A) of the electric machine (7) and a ring gear (16) of the planetary transmission device (15) is either fixable to a housing or coupled to the transmission input shaft (9) by the additional shift element (8).

5. A hybrid vehicle transmission (3) comprising:
a transmission input shaft (9) being connectable to a drive motor (2) by a shift element (12), and
an electric machine (7) being operatively connectable to the transmission input shaft (9) to transmit torque,
an additional shift element (8) being provided, by which the electric machine (7) being disconnectable from the transmission input shaft (9) and operatively connectable to the transmission input shaft,
the electric machine (7) being disconnected from the transmission input shaft (9), in a first shift position (S1) of the additional shift element (8), and being coupled to the transmission input shaft (9), in a second shift position (S2) of the additional shift element (8),
a planetary transmission device (15) being provided in a region of the shiftable operative connection between the electric machine (7) and the transmission input shaft (9), and
a sun gear (17) of the planetary transmission device (15) is fixed to a housing, while a ring gear (16) of the planetary transmission device (15) is connectable to a rotor (7A) of the electric machine (7) by the additional shift element (8) and a planet carrier (18) of the planetary transmission device (15) is coupled to the transmission input shaft (9).

6. The hybrid vehicle transmission according to claim 5, wherein, in the second shift position (S2) of the additional shift element (8), the rotor (7A) of the electric machine (7) is directly connected to the transmission input shaft (9) while the rotor (7A) is disconnected from the ring gear (16) of the planetary transmission device (15).

7. The hybrid vehicle transmission according to claim 6, wherein, in a third shift position (S3) of the additional shift element (8), the electric machine (7) is connected in a region of the rotor (7A) to the ring gear (16) of the planetary transmission device (15) in a rotationally fixed manner and the direct connection between the rotor (7A) and the transmission input shaft (9) is interrupted.

8. A hybrid vehicle transmission (3) comprising:
a transmission input shaft (9) being connectable to a drive motor (2) by a shift element (12),
an electric machine (7) being operatively connectable to the transmission input shaft (9) for transmitting torque,
an additional shift element (8) being provided, by which the electric machine (7) being disconnectable from the transmission input shaft (9) and being operatively connectable to the transmission input shaft,
the electric machine (7) being disconnected from the transmission input shaft (9), in a first shift position (S1) of the additional shift element (8), and being coupled to the transmission input shaft (9), in a second shift position (S2) of the additional shift element (8),
a planetary transmission device (15) being provided in a region of the shiftable operative connection between the electric machine (7) and the transmission input shaft (9), a ring gear (16) of the planetary transmission device (15) being fixed to a housing, while a planet carrier (18) of the planetary transmission device (15) being connectable to the transmission input shaft (9), by the additional shift element (8), and a sun gear (17) of the planetary transmission device (15) being coupled to a rotor (7A) of the electric machine (7).

9. The hybrid vehicle transmission according to claim 1, wherein the additional shift element (8) is a form-locking shift element and is synchronizable by the electric machine (7).

10. The hybrid vehicle transmission according to claim 1, wherein the additional shift element (8) is one of a friction-locking multi-disk shift element or a synchronizer.

11. The hybrid vehicle transmission according to claim 1, wherein a transmission pump (14) is operatively connected to the transmission input shaft (9), in the region of the shiftable operative connection between the electric machine (7) and the transmission input shaft (9), such that the transmission pump (14) is drivable by both the drive motor (9) and the electric machine (7).

* * * * *